US006633092B2

United States Patent
Dähler et al.

(10) Patent No.: US 6,633,092 B2
(45) Date of Patent: Oct. 14, 2003

(54) PROTECTION OF A DYNAMIC VOLTAGE RESTORER

(75) Inventors: Peter Dähler, Remigen (CH); Gerold Knapp, Ennetbaden (CH)

(73) Assignee: ABB Industrie AG, Baden (CH)

( * ) Notice: Subject to any disclaimer, the term of this patent is extended or adjusted under 35 U.S.C. 154(b) by 161 days.

(21) Appl. No.: 09/891,348

(22) Filed: Jun. 27, 2001

(65) Prior Publication Data

US 2002/0012215 A1 Jan. 31, 2002

(30) Foreign Application Priority Data

Jun. 30, 2000 (EP) ............................................ 00810569

(51) Int. Cl.$^7$ ............................................. H01H 79/00
(52) U.S. Cl. ........................... 307/100; 307/43; 307/45; 307/46
(58) Field of Search .......................... 323/207; 307/43, 307/45, 46, 100

(56) References Cited

U.S. PATENT DOCUMENTS

| 4,686,618 A | * | 8/1987 | McMurray ................... 363/58 |
| 5,734,256 A | * | 3/1998 | Larsen et al. ............... 323/207 |
| 6,219,265 B1 | | 4/2001 | Berbet et al. | |

FOREIGN PATENT DOCUMENTS

| DE | 19600547 A1 | 1/1997 |
| DE | 19736904 A1 | 3/1999 |
| EP | 0954082 A2 | 11/1999 |

OTHER PUBLICATIONS

P. Daehler and R. Affolter, "Requirements and Solutions For Dynamic Voltage Restorer, A Case Study", Feb. 2000. pp. 1–5.

* cited by examiner

Primary Examiner—Brian Sircus
Assistant Examiner—Robert L. DeBeradinis
(74) Attorney, Agent, or Firm—Burns, Doane, Swecker & Mathis, L.L.P.

(57) ABSTRACT

A short circuit within the dynamic voltage restorer (1) is immediately detected by a short circuit detection units (9) which permanently monitors currents and voltages in the voltage source converter (3) and energy storage capacitor bank (2).

Upon detection a fast discharge of the capacitor bank (2) including firing of all available semiconductors of the voltage source converter (3) and distributing the resulting current stress as evenly as possible within the voltage source converter (3) is initiated.

Instead of letting costly fuses interrupt the high short circuit currents, these currents are detected and evenly distributed within the converter.

9 Claims, 3 Drawing Sheets

PROTECTION OF A DYNAMIC VOLTAGE RESTORER

TECHNICAL FIELD

This invention relates to a method to protect a dynamic voltage restorer against thermal or mechanical damage in case of an internal short circuit.

The invention further relates to a dynamic voltage restorer for carrying out that method.

BACKGROUND ART

A dynamic voltage restorer is designed to compensate short-term disturbances in an AC system such as voltage dips or voltage swells by injecting a series voltage by means of a voltage source converter. In order to be independent from an external power source during such disturbances a large energy storage device arranged by capacitor banks is required.

"Requirements and Solutions for Dynamic Voltage Restorer, A Case Study" (P. Dähler, R. Affolter; IEEE PES 2000, Singapore) describes a dynamic voltage restorer rated for 4MVA load and a compensation capability specified for a 38% 3-phase dip of 150 ms duration. The converter was based on conventional 2-level topology. Due to the moderate rating an energy storage capacitor bank of 245 mF/2200V was sufficient and a conventional protection concept utilizing fuses was used.

The following design example is based on a dynamic voltage restorer specification with a significantly higher rating:

Load to be protected: $S_{GN}$=15 MVW cos($\Phi$)=0.9

Worst case voltage dip to be compensated: $\Delta u_G$=35% 3-pase dip 500 ms

When focussing on large-scale applications the neutral point clamped (NPC) circuit topology as described in EP 0,969,586 is the preferred solution. To be able to compensate an AC voltage dip of these parameters a DC link with the following main data is required:

DC Link Voltage: $U_d$=±5200 V (nominal at begin of fault)
$U_d$=±2400 V (minimal at end of fault)

Total Capacitance: $C_D$=237 mF (5200 V)

Stored Energy: $E_D$=3.2 MJ (5200 V)

With such a large capacitor bank the well-known DC link protection problem with voltage source converters is dramatically accentuated. The design of the bank and its protection concept must ensure that no thermal or mechanical damages can occur at the following internal fault events:

Semiconductor failure within the voltage source converter leading to a "Fire Through" condition across one side of the DC link (+ or − to midpoint) or across the total DC link (+ to −), Short circuit across DC busbar (+ or − to midpoint/+ to −) within the capacitor bank or the voltage source converter, Internal or external short circuit of individual capacitor cans, and Ground faults within the capacitor bank or the voltage source converter.

BRIEF DISCLOSURE OF THE INVENTION

It is a principle object of the present invention to provide a method to protect a dynamic voltage restorer comprising a voltage source converter and a large energy storage capacitor bank against thermal or mechanical damage in case of a short circuit within the converter or the capacitor bank. It is a further object of the invention to provide a dynamic voltage restorer for carrying out that method.

These and other objects are accomplished with the claimed invention as follows:

A short circuit within the converter or the capacitor bank is immediately detected by a short circuit detection unit which permanently monitors currents and/ or voltages in the dynamic voltage restorer. Upon detection either a normal off sequence of the capacitor bank including normal capacitor bank discharge, or a fast discharge of the capacitor bank including firing of all available semiconductors of the converter (protection firing) and distributing the resulting current stress as evenly as possible within the converter is initiated. The short circuit currents are detected and evenly distributed within the converter so that expensive fuses to interrupt the high short circuit currents are not needed.

Thanks to at least one can resistor connected in series to each string of capacitor cans the current stress resulting of the protection firing is kept within the surge capability of the semiconductors.

The can resistors eliminate the need for costly high current fuses, which had to be replaced after a short circuit within the converter or the energy storage device. They also reduce the risk for very high mechanical forces and therefor help lower costs for construction efforts.

BRIEF DESCRIPTION OF THE DRAWINGS

The invention will be explained in view of the following detailed description of exemplary embodiments together with the accompanying drawings in which.

DETAILED DESCRIPTION OF THE INVENTION

Figure 1:
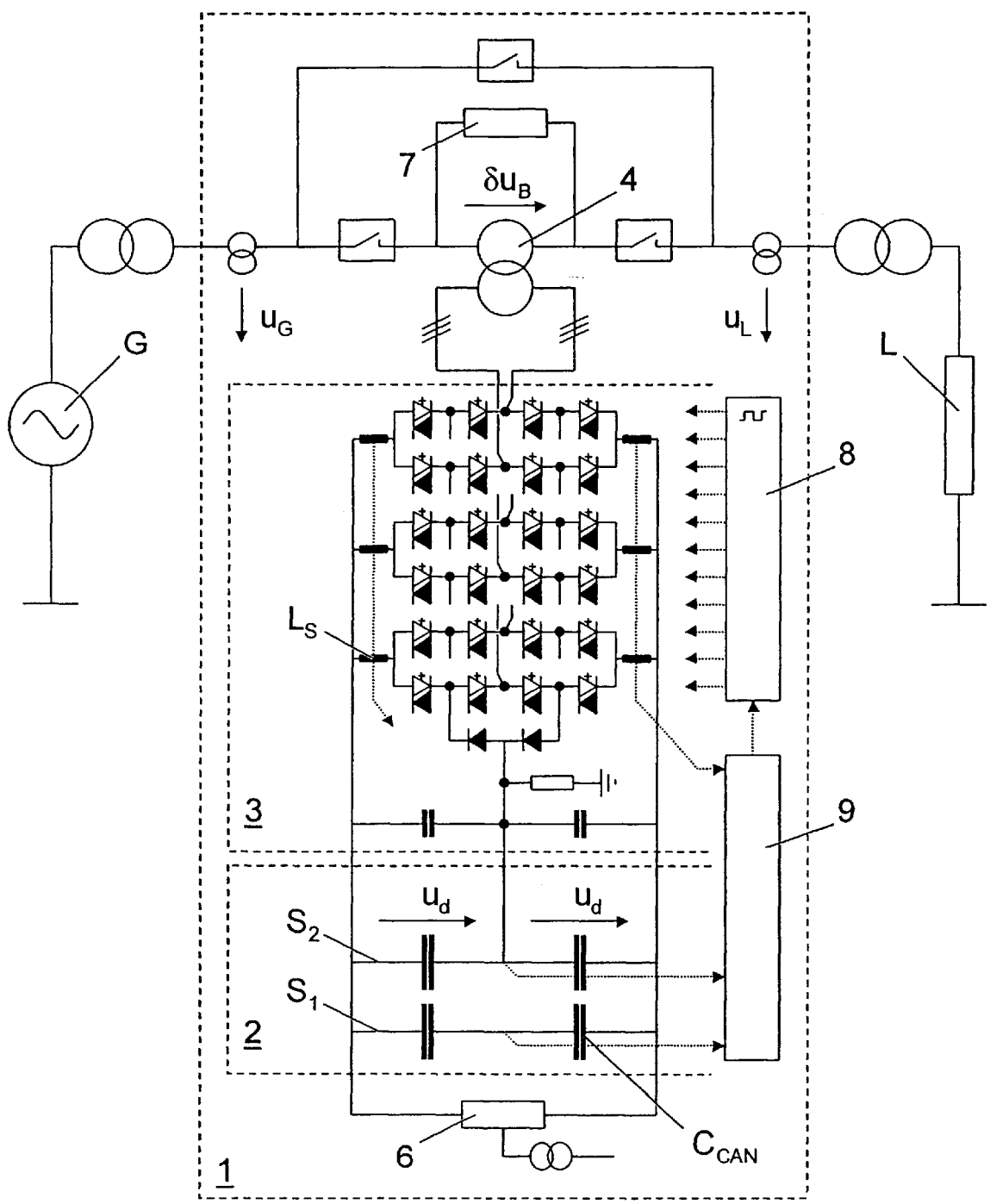
FIG. 1 is a schematic diagram illustrating a dynamic voltage restorer with a voltage source converter and an energy storage capacitor bank.

As shown in FIG. 1, a dynamic voltage restorer 1 is designed to compensate short term disturbances in an AC system (Grid G, grid voltage $u_G$ and Load L, load voltage $u_L$) such as voltage dips or voltage swells by injecting a series voltage $\delta u_B$ by means of a voltage source converter 3. In order to enable the neutral point clamped voltage source converter 3 to generate the AC voltage $\delta u_B$ without even order harmonics, a balanced bipolar DC voltage $\pm U_d$ (e.g. ±2600 V) at its DC link terminals is required during the whole boosting interval (e.g. 500 ms). This is provided by the energy storage capacitor bank 2.

Figure 2:
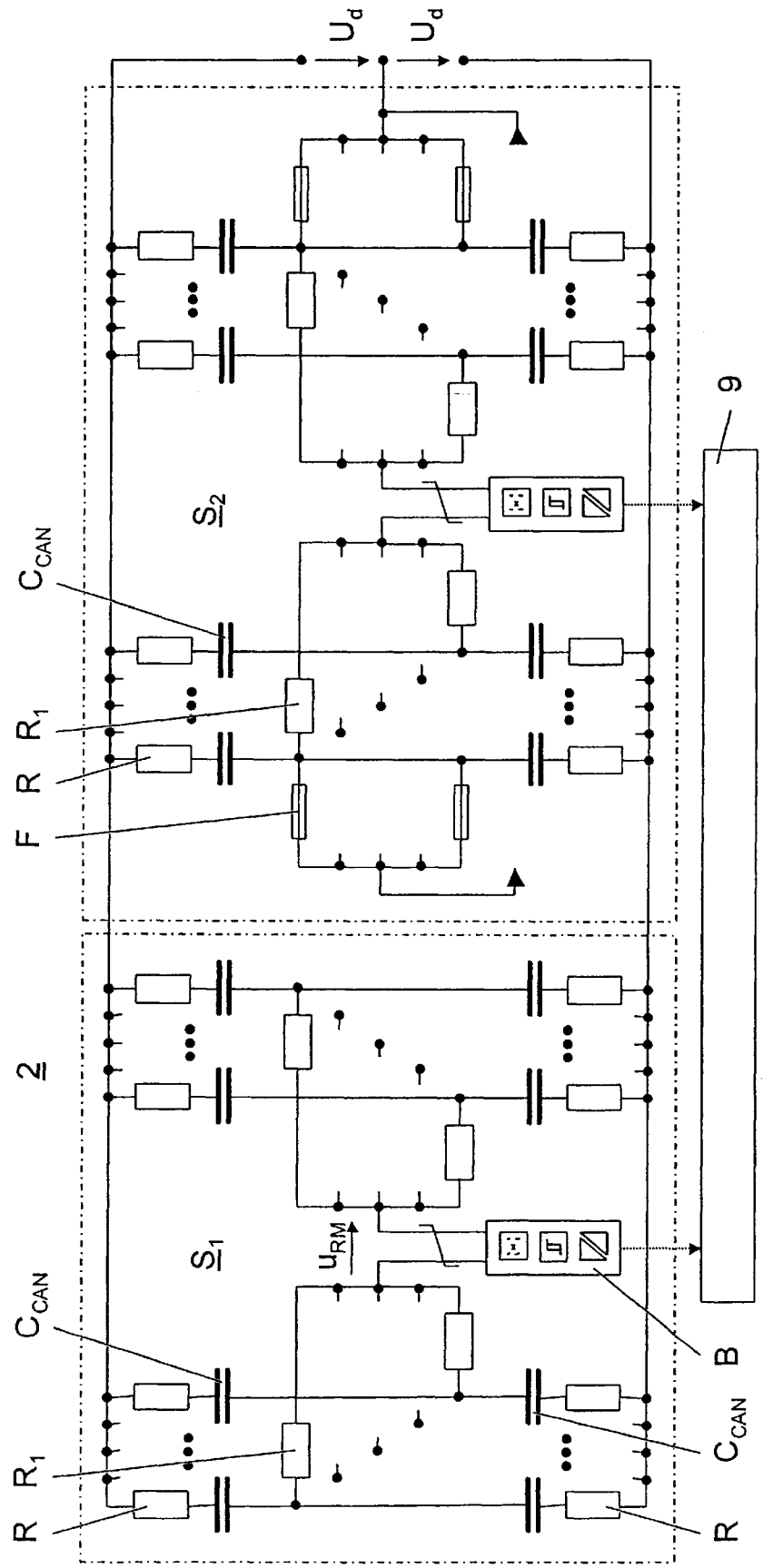
FIG. 2 is a detailed schematic diagram illustrating the energy storage capacitor bank of FIG. 1 with two subbanks.

The capacitors directly connected to the voltage source converter 3 are minimized and are not sufficient to ensure an adequate DC voltage balance. Therefore a part of the main capacitor bank 2 has to be configured as subbank $S_2$ with a common midpoint connected to the midpoint of the voltage source converter 3. In the design example used here and illustrated in FIG. 2 half of the whole capacitor bank 2 are arranged in this manner. This allows operating the dynamic voltage restorer 1 without additional active balancing actions by means of the converter control, which would result in an increased switching frequency of the voltage source converter 3.

The individual capacitor can $C_{Can}$ used for the capacitor bank has the following main data:

$C_{CanN}$=5.17 mF $U_{CanN}$=2600 V dry type, selfhealing

The other subbank $S_1$ is configured with parallel strings of two series connected capacitor cans $C_{Can}$. The midpoints between the two series connected capacitor cans are basically floating.

The subbank $S_2$ is arranged in the same way as subbank $S_1$. The only difference is that the midpoints are starpoint connected via individual high voltage low current fuses F and connected with the voltage source converter 3 midpoint.

A low ohmic resistor R is connected in series to each capacitor can $C_{Can}$. Its energy absorption capability is slightly higher than the energy stored in one capacitor can $C_{CAN}$ at maximum DC voltage (2800 V). The resistance is chosen in order to enable the voltage source converter 3 to withstand the current surges taking place in the event of a fast emergency discharge (thermally as well as mechanically). Since these resistors also dissipate some energy in the event of a voltage-boosting event of the dynamic voltage restorer an increase of the required bank capacitance in the range of 5–10% is required.

A failure of a semiconductor (IGCT, antiparallel diode or NPC diode) in the voltage source converter 3 or its associated firing control (gate unit 8, control electronics) leads to a fire through condition which means a short circuit between half of the capacitor banks DC link or the total DC link. Without counter actions the resulting current surge would cause severe mechanical destruction and thermal failure damage of all semiconductors in the loop.

A conventional protection approach would be to install fuses in series with the capacitor cans or in series with groups of cans. This solution however would have the consequence that many fuses would have to be replaced at the event of a single semiconductor failure.

The strategy of this invention for this fault is called protection firing. The fault is detected by means of a short circuit detection unit 9 within <15 μs. The detection is based on monitoring currents by measuring windings attached to snubber reactors $L_s$. Following to the detection of the fault all available voltage source converter branches are fired in order to distribute the current stress as evenly as possible. The resistance of the can resistors R is chosen in order to keep the resulting stresses within the surge capability of the semiconductors (R between 1 and 5 Ω). In addition the mechanical forces are kept within acceptable limits.

The major part of the energy stored in the capacitor bank 2 is evenly distributed to all can resistors R. Their energy absorption capability is designed to savely survive this current stress.

Neglecting short-term oscillations (ms-range due to the closely coupled voltage source converter capacitors) the discharge of the capacitor bank will basically take place exponentially with a time constant $\tau_{PF}$:

$$\tau_{PF} \approx \frac{2 \cdot R \cdot C_D}{N} \approx 11\,ms$$

where

R=2.1 Ω Can resistor $C_D$=237 mF Total bank capacitance

N=96 Total number parallel strings per bank

For the capacitor bank 3 a short circuit across the DC Busbar (which is very unlikely) is very similar to a semiconductor failure.

If the fault takes place across the total bank, a total discharge will take place (time constant approx. 12 ms). Thanks to the can resistors R only a small part of the stored energy will dissipate in the fault flash. This fact (the small energy and the short discharge time) will keep the resulting damage within limits.

The fault is detected by monitoring the DC link voltages. As a strategy a normal switch off sequence (normal DC discharge, AC bypass etc.) is initiated. It should be recognized however, that this action does not have an impact on the actual fault scenario.

The selfhealing property of the capacitor can technology makes an internal short circuit of individual capacitor cans very unlikely. However it should not be completely excluded in the protection considerations. An external short circuit of individual capacitor cans could be caused by the visit of a small animal or a tool lost in the capacitor bank.

This fault has a basically different effect on the two subbanks and should therefore be treated separately.

In the case of a short circuit across a capacitor can of subbank $S_1$ with floating midpoints, the voltage stress of the healthy can of the same series string will be doubled (5200 V instead of 2600 V at nominal DC voltage or 5600 V instead of 2800 V at maximum DC voltage). The rise of the voltage stress will be exponential with the following time constant $\tau_c$:

$$\tau_c \approx 2 \cdot R \cdot C_{CAN} \approx 22\,ms$$

Figure 3:
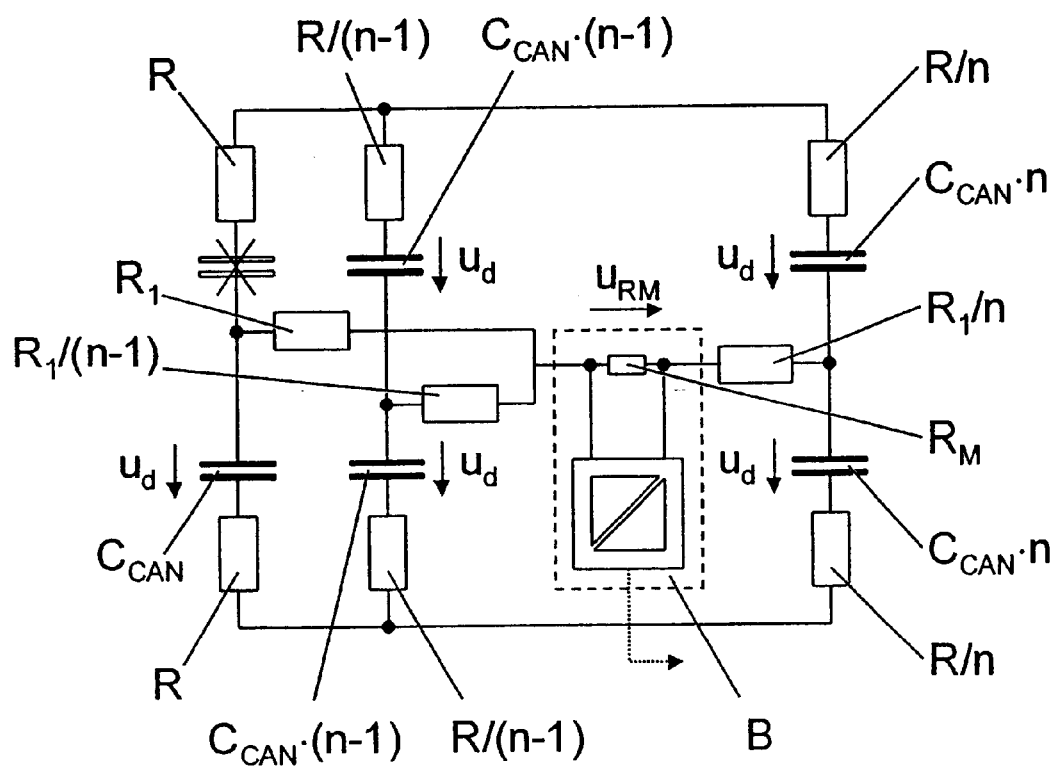
FIG. 3 is a detailed schematic diagram illustrating one of the two subbanks of FIG. 2 in case of a short circuit.

A special circuit has been developed to detect this fault case. According to FIG. 2 the subbank $S_1$ is divided into two halves. By means of high ohmic resistors ($R_1$=1MΩ) a star point is formed for each half subbank. The voltage $u_{RM}$ between these two star points is monitored by a threshold detection device B. During normal operation this voltage is approximately zero. In case of a can short circuit as shown in FIG. 3 the potential of the affected starpoint will jump and the voltage $u_M$ will instantly jump to the value $U_{RM}$ and according to the time constant $\tau_C$ to the steady state value $U_{Rmstat}$ which is twice the instant value.

The steady state and the instantaneous voltage levels for the detection are approximately as follows:

$$U_{RMstat} \approx U_d \cdot \frac{R_M}{2 \cdot R_l + n \cdot R_M} \approx 66\,V$$

$$U_{RM} \approx \frac{U_{RMstat}}{2} \approx 33\,V$$

where n=23 Number of strings per half subbank $U_d$=2600 V Prefault voltage per can $R_1$=1 MΩ Can fault measuring resistor (Umax=3 kV, Pmax=10 W)

$R_M$=120 kΩ Input resistance of threshold detection device B

Two potential actions can be taken upon detection of the fault:

Initiation of protection firing upon fast detection of $u_{RM}(t) > U_{RM}$. Thanks to the fast discharge the healthy can of the affected string will not face any significant overvoltage.

Initiation of the normal off sequence including normal DC bank discharge. In this case the healthy can of the affected string will face some overvoltage in the 1 s to 10 s time range, depending on the normal discharge time constant. It is recommended to design the discharge time constant as short as possible with reasonable cost If the capacitor cans $C_{CAN}$ are designed to withstand double voltage for a short period of time this second strategy is recommended.

The two can resistors of the affected string will absorb approximately half of the energy to be absorbed in the case of a semiconductor failure within the voltage source converter or a short circuit across the DC busbar.

$$E_R \approx 0.5 \cdot \frac{U_d^2 \cdot C_{CAN}}{2} \approx 10 \text{ kJ}$$

In case of a capacitor can short circuit within the subbank $S_2$ with fused midpoints all healthy cans of the same side of the subbank will feed into the fault. Without fuses in the midpoint connections the affected side of the subbank would fully discharge. Most of the stored energy (approx. 0.8 MJ at $U_d$=2600 V) would be dissipated in the can resistor R of the faulty can. This huge energy pulse would destroy the can resistor R with the result of unpredictable damage in its neighborhood.

The fuses F are designed to selectively interrupt this discharge loop. That means only the faulty can and the corresponding fuse has to be replaced after such an event.

After the successful interruption of the discharge loop the healthy can of the affected series string will also face double voltage stress. Everything said for the floating midpoint subbank $S_1$ is now also valid here.

The midpoint of the DC link is grounded via a high ohmic resistor (e.g. 200 Ω) at the voltage source converter. This concept makes sure that no dangerous current will flow in the event of a ground fault at any location of the system (capacitor bank or voltage source converter). In addition no fuses in the midpoint will interrupt.

The electrical potentials of all three DC link terminals (+, −, 0) towards ground are monitored. In case of a ground fault all potentials will significantly deviate from the balanced condition. A normal off sequence (normal DC discharge, AC bypass, etc.) is initiated in this case, IT should be noted that there is no need for fast action in this fault case.

A ground fault of the midpoint is highly unlikely and if it happens it has no effect on the operation of the system. The matter of concern for this case is that a second ground fault at another location would lead to a significant fault current. The protection described in case of a short circuit across the DC Busbar however covers this double contingency case.

LIST OF DESIGNSTION

| | |
|---|---|
| 1 | Dynamic voltage restorer |
| 2 | Energy storage capacitor bank |
| 3 | Voltage source converter |
| 4 | Injection transformer |
| 6 | Charging unit |
| 7 | Filter |
| 8 | Gate control unit |
| 9 | Short circuit detection unit |
| B | Threshold detection device |
| $C_{CAN}$ | Capacitor can |
| F | Fuse |
| G | Grid |
| L | Load |
| $L_S$ | Snubber Reactor |
| R | Can resistor |
| $R_1$ | Starpoint resistor |
| $R_M$ | Threshold detection resistor |
| $S_1, S_2$ | Subbanks |
| $U_d$ | DC link voltage, capacitor can voltage |
| $\delta u_B$ | AC Boost voltage |
| $u_G$ | Grid voltage |
| $u_L$ | Load voltage |
| $u_{RM}$ | Starpoint voltage |

What is claimed is:

1. Method to protect a dynamic voltage restorer comprising an energy storage capacitor bank with at least one subbank of at least one string of two series connected capacitor cans, whereas in the case that the subbank comprises two or more strings of series connected capacitor cans these strings are parallel and the midpoints of these strings are connected to a starpoint by high resistance resistors, and a voltage source converter with at least two converter branches comprising each at least one pair of semiconductors against thermal or mechanical damage in case of a short circuit within the converter or the capacitor bank, comprising the steps of:

monitoring currents in the converter and/or the voltages of the midpoints of the strings of series connected capacitor cans in order to detect a short circuit, upon detection of the short circuit initiating the discharge of the capacitor bank, and discharging all capacitor cans.

2. Method to protect a dynamic voltage restorer comprising an energy storage capacitor bank with at least one capacitor can and a voltage source converter with at least two converter branches each branch comprising at least one pair of semiconductors, against thermal or mechanical damage in case of a short circuit within the converter or the capacitor bank, the method comprising:

monitoring currents in the converter and/or voltages in the capacitor bank in order to detect a short circuit;

upon detection of the short circuit, initiating discharge of the capacitor bank; and discharging all capacitor cans;

wherein the discharge of the capacitor cans is done by firing all available semiconductors within the converter.

3. A dynamic voltage restorer comprising an energy storage capacitor bank with at least one capacitor can and a voltage source converter, wherein at least one can resistor is connected in series to the at least one capacitor can.

4. A dynamic voltage restorer as in claim 3 wherein the can resistor has a resistance between 1 and 5 Ω.

5. A dynamic voltage restorer as in claim 3 wherein the capacitor bank comprises at least one subbank, and the subbank comprises at least one string of two series-connected capacitor cans.

6. A Dynamic Voltage Restorer as in claim 5 wherein the subbank comprises at least two parallel strings of two series-connected capacitor cans, and the midpoints between the series-connected capacitor cans of the strings are starpoint-connected by fuses.

7. A Dynamic Voltage Restorer as in claim 6 wherein the subbank is divided into two halves each comprising at least two parallel strings of two series-connected capacitor cans, and the midpoints between the series-connected capacitor cans of the strings of each half subbank are starpoint-connected by high resistance resistors.

8. A Dynamic Voltage Restorer as in claim 5 wherein the subbank comprises at least two parallel strings of two series-connected capacitor cans, and the midpoints between the series-connected capacitor cans of the strings are starpoint-connected by high resistance resistors.

9. A Dynamic Voltage Restorer as in claim 8 wherein the starpoint is connected to a short circuit detection unit, and said short circuit detection unit comprises means to compare the voltage of the starpoint of a subbank or half a subbank to a reference value and/or to the voltage of the starpoint of another subbank or half a subbank, and means to initiate discharge of the capacitor cans of the subbank.

\* \* \* \* \*

UNITED STATES PATENT AND TRADEMARK OFFICE
CERTIFICATE OF CORRECTION

PATENT NO. : 6,633,092 B2
DATED : October 14, 2003
INVENTOR(S) : Peter Dahler et al.

It is certified that error appears in the above-identified patent and that said Letters Patent is hereby corrected as shown below:

<u>Title page,</u>
Item [73], Assignee, change "ABB Industrie AG, Baden (CH)" to -- ABB Schweiz AG, Baden (CH) --

Signed and Sealed this

Twenty-fifth Day of May, 2004

JON W. DUDAS
*Acting Director of the United States Patent and Trademark Office*